United States Patent
Liu et al.

(10) Patent No.: US 12,108,441 B2
(45) Date of Patent: Oct. 1, 2024

(54) METHOD AND DEVICE FOR SENDING AND PROCESSING ACCESS CONTROL SIGNALING

(71) Applicant: ZTE Corporation, Shenzhen (CN)

(72) Inventors: Kun Liu, Shenzhen (CN); Bo Dai, Shenzhen (CN); Weiwei Yang, Shenzhen (CN); Huiying Fang, Shenzhen (CN); Luanjian Bian, Shenzhen (CN); Youjun Hu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 501 days.

(21) Appl. No.: 17/424,281

(22) PCT Filed: Jan. 20, 2020

(86) PCT No.: PCT/CN2020/073228
§ 371 (c)(1),
(2) Date: Jul. 20, 2021

(87) PCT Pub. No.: WO2020/151662
PCT Pub. Date: Jul. 30, 2020

(65) Prior Publication Data
US 2022/0124797 A1    Apr. 21, 2022

(30) Foreign Application Priority Data
Jan. 21, 2019 (CN) .......................... 201910054931.2

(51) Int. Cl.
*H04W 74/04*       (2009.01)
*H04L 1/1812*      (2023.01)
(Continued)

(52) U.S. Cl.
CPC .......... *H04W 74/04* (2013.01); *H04L 1/1812* (2013.01); *H04L 5/0053* (2013.01); *H04W 72/23* (2023.01);
(Continued)

(58) Field of Classification Search
None
See application file for complete search history.

(56) References Cited

U.S. PATENT DOCUMENTS

| | | | |
|---|---|---|---|
| 2018/0376511 A1 | 12/2018 | Tsai | |
| 2019/0007163 A1* | 1/2019 | Sun | ........................ H04L 5/0094 |

(Continued)

FOREIGN PATENT DOCUMENTS

| | | |
|---|---|---|
| CN | 102149208 A | 8/2011 |
| CN | 102548015 A | 7/2012 |

(Continued)

OTHER PUBLICATIONS

International Search Report for corresponding application PCT/CN2020/073228 filed Jan. 20, 2020; Mail date Apr. 9, 2020.

*Primary Examiner* — Alex Skripnikov
*Assistant Examiner* — Pamit Kaur
(74) *Attorney, Agent, or Firm* — CANTOR COLBURN LLP

(57) ABSTRACT

Provided are a method and device for sending and processing access control signaling. The method for sending access control signaling includes: sending, by a base station, indication information to User Equipment (UE) via a downlink control channel in a search space, wherein the indication information is used for indicating to trigger a contention-based random access procedure or a non-contention-based random access procedure.

14 Claims, 2 Drawing Sheets

UE receives, on a downlink control channel in a search space, indication information sent by a base station, wherein the indication information is used for indicating to trigger a contention-based random access procedure or a non-contention-based random access procedure — S102

The UE determines, according to the indication information, to send a contention-based random access signaling or a non-contention-based random access signaling — S104

(51) Int. Cl.
*H04L 5/00* (2006.01)
*H04W 72/23* (2023.01)
*H04W 74/08* (2009.01)
*H04W 74/0833* (2024.01)

(52) U.S. Cl.
CPC ... *H04W 74/0841* (2013.01); *H04W 74/0866* (2013.01)

(56) References Cited

U.S. PATENT DOCUMENTS

| | | | | |
|---|---|---|---|---|
| 2020/0014498 | A1* | 1/2020 | Bergman | H04L 1/1848 |
| 2020/0021419 | A1* | 1/2020 | Taherzadeh Boroujeni | H04L 5/0091 |
| 2020/0252971 | A1* | 8/2020 | Wu | H04L 5/0007 |
| 2020/0275479 | A1* | 8/2020 | Peisa | H04W 74/0833 |
| 2021/0344458 | A1* | 11/2021 | Zhou | H04W 72/0453 |
| 2021/0378026 | A1* | 12/2021 | Ohara | H04W 74/02 |

FOREIGN PATENT DOCUMENTS

| | | |
|---|---|---|
| CN | 102932950 A | 2/2013 |
| CN | 108289339 A | 7/2018 |
| CN | 108617003 A | 10/2018 |
| WO | 2018030494 A1 | 2/2018 |

\* cited by examiner

Fig.1

A base station sends indication information to UE via a downlink control channel in the search space, wherein the indication information is used for indicating to trigger a contention-based random access procedure or a non-contention-based random access procedure — S102

Fig.2

UE receives, on a downlink control channel in a search space, indication information sent by a base station, wherein the indication information is used for indicating to trigger a contention-based random access procedure or a non-contention-based random access procedure — S102

The UE determines, according to the indication information, to send a contention-based random access signaling or a non-contention-based random access signaling — S104

Fig.3

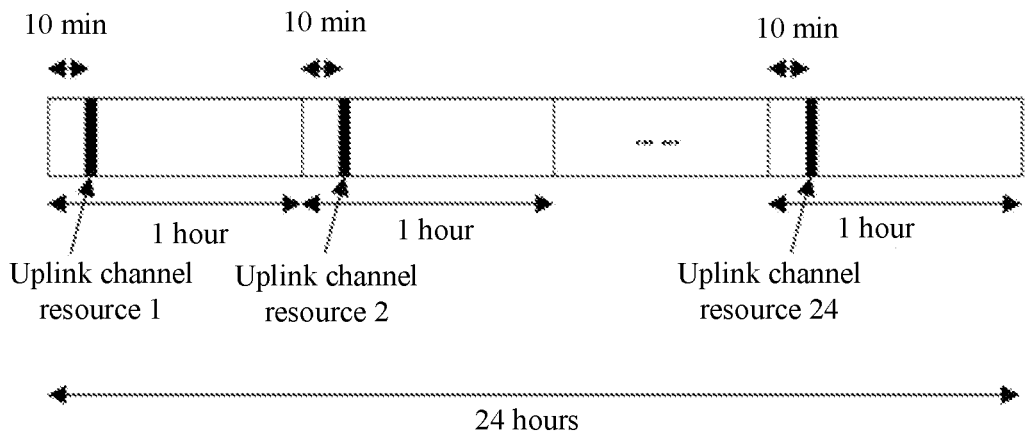

METHOD AND DEVICE FOR SENDING AND PROCESSING ACCESS CONTROL SIGNALING

The present disclosure is the National Stage Filing of PCT International Application No. PCT/CN2020/073228 filed on Jan. 20, 2020, which claims priority to Chinese Patent Application No. 201910054931.2, filed with the China National Intellectual Property Administration on Jan. 21, 2019, the disclosure of which is incorporated herein by reference in its entirety.

TECHNICAL FIELD

The present disclosure relates to the field of communications, and in particular, to a method and device for sending and processing access control signaling.

BACKGROUND

With the development of intelligent terminals and the richness of wireless data application services, the number of data users in a wireless communication network greatly increases, wireless data content is no longer limited to traditional text or images, and more and more multimedia service contents such as high-definition video and mobile television emerge, thereby resulting in an explosive increase in traffic of the wireless communication network. Mobile Internet and Internet of Things services will become the main driving force for mobile communication development. For the Internet of Things, the 3GPP standardization organization has regulated two very representative communication standard protocols, Machine Type Communication (MTC) and Narrow Band Internet of Things (NB-IoT). For the Mobile Internet, the 3GPP standardization organization has newly regulated a 5G New Radio (NR) communication standard protocol. With regard to the described communication standard protocols, when there is no data to be sent or received, User Equipment (UE) will enter a Radio Resource Control IDLE (RRC IDLE, or RRC_IDLE) state, thereby saving the power consumption of the UE.

According to the regulation of the above communication standard protocols, before sending or receiving data, UE needs to transit from an RRC IDLE state to a Radio Resource Control CONNECT (RRC CONNECT, or RRC_CONNECT) state, and then send or receive data. However, when the UE transits from the RRC IDLE state to the RRC CONNECT state, a large amount of power and resources are consumed at the UE side.

SUMMARY

Embodiments of the present disclosure provide a method and device for sending and processing access control signaling, which may at least solve the problem in the related art that when UE sends or receives data, the UE needs to transit from an RRC IDLE state to an RRC CONNECT state, thereby consuming a large amount of power and resources at a UE side.

According to some embodiments of the present disclosure, provided is a method for sending access control signaling, including the following operations. A base station sends indication information to UE via a downlink control channel in a search space, wherein the indication information is used for indicating to trigger a contention-based random access procedure or a non-contention-based random access procedure.

In at least one exemplary implementation of the embodiments, the indication information includes Hybrid Automatic Repeat Request Acknowledgement (HARQ-ACK) information for data sent by the UE on an uplink channel.

In at least one exemplary implementation of the embodiments, the search space is contained in a first set, and the first set includes at least one search space.

In at least one exemplary implementation of the embodiments, the search space is contained in a second set, wherein the second set is a subset of the first set, and the second set is configured by the base station for the UE, or is preconfigured in the base station and the UE.

In at least one exemplary implementation of the embodiments, a sending period of at least one search space in the second set is N times of a configuration period of the at least one search space in the first set, wherein N is greater than or equal to 1.

In at least one exemplary implementation of the embodiments, P search spaces subsequent to M search spaces in the first set are taken as at least one search space in the second set, wherein M and P are natural numbers.

In at least one exemplary implementation of the embodiments, the base station fails to detect data sent by the UE on an uplink channel corresponding to each search space of the M search spaces.

In at least one exemplary implementation of the embodiments, in a case of detecting that there is data sent by the UE in an uplink channel corresponding to the search space, the base station sends the indication information to the UE via the downlink control channel in the search space.

In at least one exemplary implementation of the embodiments, in a case where the base station sends the indication information to the UE via the downlink control channel in the search space, and the indication information is used for indicating to trigger the non-contention-based random access procedure, the indication information further includes location information, in a random access channel resource set, of a random access channel allocated in the non-contention-based random access procedure, wherein the location information is at least used for indicating one of the following: the random access channel allocated in the non-contention-based random access procedure is contained in the random access channel resource set and is a Q-th random access channel after the indication information; or the random access channel allocated in the non-contention-based random access procedure is contained in the random access channel resource set and is an R-th random access channel preceding a next uplink channel resource, wherein Q and R are positive integers.

According to some other embodiments of the present disclosure, provided is a method for processing access control signaling. UE receives, on a downlink control channel in a search space, indication information sent by a base station, wherein the indication information is used for indicating to trigger a contention-based random access procedure or a non-contention-based random access procedure. The UE determines to send a contention-based random access signaling or a non-contention-based random access signaling according to the indication information.

In at least one exemplary implementation of the embodiments, the indication information includes HARQ-ACK information for data sent by the UE on an uplink channel.

In at least one exemplary implementation of the embodiments, the search space is contained in a first set, and the first set includes at least one search space.

In at least one exemplary implementation of the embodiments, the method further includes the following operation.

The UE detects the indication information on the downlink control channel in the search space contained in a second set, wherein the second set is a subset of the first set, and the second set is configured by the base station for the UE, or is preconfigured in the base station and the UE.

In at least one exemplary implementation of the embodiments, a sending period of at least one search space in the second set is N times of a configuration period of the at least one search space in the first set, wherein N is greater than or equal to 1.

In at least one exemplary implementation of the embodiments, P search spaces subsequent to M search spaces in the first set are taken as at least one search space in the second set, wherein M and P are natural numbers.

In at least one exemplary implementation of the embodiments, the UE does not send data on an uplink channel corresponding to each search space of the M search spaces.

In at least one exemplary implementation of the embodiments, the method further includes the following operation. The UE sends data on an uplink channel corresponding to the search space in which the UE receives the indication information sent by the base station.

In at least one exemplary implementation of the embodiments, in a case where the UE determines, according to the indication information, to send the non-contention-based random access signaling, the method further includes the following operation. The UE executes, in a case where a first condition is satisfied, a first operation according to a random access response message sent by the base station, wherein the first condition includes at least one of the following: HARQ-ACK information in the indication information is an ACK; and a value of a domain in uplink resource grant information in the random access response message is a first value set, wherein the first operation includes at least one of the following: the UE detects the downlink control channel in the search space; and the UE sends data on an uplink channel subsequent to a current uplink channel.

In at least one exemplary implementation of the embodiments, the operation that the UE detects the downlink control channel in the search space includes: the UE detects the downlink control channel in the search space within a first time window, wherein a length of the first time window and a starting moment of the first time window are configured by the base station for the UE or are preconfigured in the base station and the UE; or, the UE detects the downlink control channel in the search space until a detection time of the search space expires.

In at least one exemplary implementation of the embodiments, in a case where the UE determines, according to the indication information, to send the non-contention-based random access signaling, the method further includes the following operation. The UE executes, in a case where a second condition is satisfied, a second operation according to a random access response message sent by the base station, wherein the second condition includes at least one of the following: HARQ-ACK information in the indication information is a NACK; and the random access response message sent by the base station includes uplink resource grant information, wherein the second operation includes at least one of the following: the UE sends data on an uplink channel subsequent to a current uplink channel; or the UE sends data on an uplink channel indicated by the uplink resource grant information in the random access response message.

In at least one exemplary implementation of the embodiments, in a case where the second operation is that the UE sends data on the uplink channel indicated by the uplink resource grant information in the random access response message, and the UE receives ACK information fed back by the base station for the second operation, the method further includes the following operation. The UE detects the downlink control channel in the search space within a second time window, wherein a length of the second time window and a starting moment of the second time window are configured by the base station for the UE or are preconfigured in the base station and the UE; or, the UE detects the downlink control channel in the search space until a detection time of the search space expires.

In at least one exemplary implementation of the embodiments, in a case where the second operation is that the UE sends data on the uplink channel indicated by the uplink resource grant information in the random access response message, and the UE receives NACK information fed back by the base station for the second operation, the method further includes an operation that the UE sends a random access signal on a random access channel.

In at least one exemplary implementation of the embodiments, in a case where the UE triggers the non-contention-based random access procedure according to the indication information, and the UE sends data on an uplink channel indicated by uplink resource grant information in a received random access response message, the base station sends, on the downlink channel in the search space, HARQ-ACK information for data sent on the uplink channel indicated by the uplink resource grant information in the random access response message.

In at least one exemplary implementation of the embodiments, in a case where the indication information is used for indicating to trigger the non-contention-based random access procedure, the UE sends a non-contention-based random access signaling on a random access channel, wherein location information of the random access channel is configured in the indication information, and the location information is used for indicating at least one of the following: the random access channel allocated in the non-contention-based random access procedure is contained in a random access channel resource set and is a Q-th random access channel after the indication information; the random access channel allocated in the non-contention-based random access procedure is contained in a random access channel resource set and is an R-th random access channel preceding a next uplink channel resource, wherein Q and R are positive integers.

In at least one exemplary implementation of the embodiments, after the UE receives, on the downlink control channel in the search space, the indication information sent by the base station, the method further includes at least one of the following operations: the UE sends a random access signal on a random access channel; the UE transits back to an RRC_IDLE state; the UE proposes an uplink transmission mode; and the UE releases uplink channel resources and/or search space resources of uplink transmission.

According to some other embodiments of the present disclosure, provided is a device for sending access control signaling. The device is located in a base station and includes: a sending module, configured to send indication information to UE via a downlink control channel in a search space, wherein the indication information is used for indicating to trigger a contention-based random access procedure or a non-contention-based random access procedure.

According to some other embodiments of the present disclosure, provided is a device for processing access control signaling. The device is located in UE and includes: a receiving module, configured to receive, on a downlink control channel in a search space, indication information sent by a base station, wherein the indication information is used for indicating to trigger a contention-based random access procedure or a non-contention-based random access procedure; and a processing module, configured to determine, according to the indication information, to send a contention-based random access signaling or a non-contention-based random access signaling.

According to some other embodiments of the present disclosure, provided is a storage medium. The storage medium stores a computer program, wherein the computer program is configured to execute the operations in any one of the method embodiments at runtime.

According to some other embodiments of the present disclosure, provided is an electronic device, including a memory and a processor, wherein the memory stores a computer program, and the processor is configured to run the computer program to execute the operations in any one of the method embodiments.

Through the embodiments of the present disclosure, since the indication information for triggering the random access procedure is sent on the downlink control channel in the search space, the limitation that the UE needs to transit from the RRC IDLE state to the RRC CONNECT state when sending and receiving data is removed. Therefore, the problem that UE needs to transit from an RRC IDLE state to an RRC CONNECT state when sending or receiving data, and a large amount of power and resources are consumed at the UE side can be solved, thereby achieving the effects of saving the power consumption and system resources of a UE, and improving the data transmission efficiency at the same time.

BRIEF DESCRIPTION OF THE DRAWINGS

The accompanying drawings described herein are used to provide a deeper understanding of the present disclosure, and constitute a part of the present application. The exemplary embodiments of the present disclosure and the description thereof are used to explain the present disclosure. The drawings and the exemplary embodiment do not constitute limitations to the present disclosure. In the drawings:

FIG. 1 is a flowchart of a method for sending access control signaling according to an embodiment of the present disclosure;

FIG. 2 is a flowchart of a method for sending access control signaling according to an embodiment of the present disclosure;

FIG. 3 is a schematic diagram of time domain configuration of uplink transmission configuration information according to an embodiment of the present disclosure;

DETAILED DESCRIPTION

Figure 4:
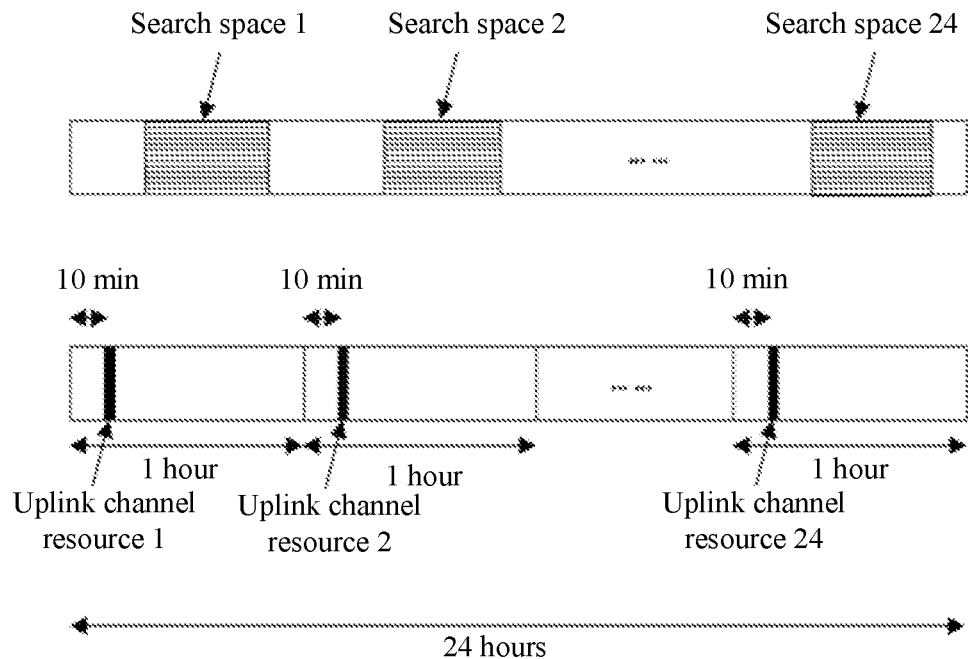
FIG. 4 is a schematic diagram of another time domain configuration of uplink transmission configuration information according to an embodiment of the present disclosure.

The present disclosure is described below in detail with reference to the drawings and in conjunction with the embodiments. It is to be noted that embodiments in the present application and characteristics in the embodiments may be combined to derive other embodiments not explicitly described.

It is to be noted that the terms "first", "second" and the like in the specification, the claims and the drawings of the present disclosure are used to distinguish similar objects, and are not used to describe a specific sequence or a precedence order.

Embodiment 1

Provided in the present embodiment is a method for sending access control signaling. FIG. 1 is a flowchart of a method for sending access control signaling according to an embodiment of the present disclosure. As shown in FIG. 1, the method includes the following operations.

At S102, a base station sends indication information to User Equipment (UE) via a downlink control channel in a search space, wherein the indication information is used for indicating to trigger a contention-based random access procedure or a non-contention-based random access procedure.

In some exemplary implementations, in order to support the UE to send data in the RRC-IDLE state, the base station needs to configure uplink transmission resources for the UE. The uplink transmission resources include configuration information of uplink channel resources and configuration information of a downlink control channel search space.

In some exemplary implementations, one search space corresponds to at least one of the uplink channel resources. Information carried on the downlink control channel includes Downlink Control Information (DCI). Meanwhile, the indication information needs to be carried in DCI.

In some exemplary implementations, the configuration information of the uplink channel resources includes configuration information of a Physical Random Access Channel (PRACH).

The configuration information of the PRACH includes at least one of the following: configuration information of time-frequency resources occupied by the PRACH; and configuration information of a random access signal sent on the PRACH.

In a case where the uplink transmission configuration information includes the configuration information of the PRACH and the configuration information of the uplink channel resources, the uplink transmission may be understood as sending uplink data during random access signal transmission, and the uplink transmission may also be considered as transmission of a random access signal carrying uplink data in a 5G NR (New Radio) system In at least one exemplary implementation of the embodiments, the indication information includes Hybrid Automatic Repeat Request Acknowledgement (HARQ-ACK) information for data sent by the UE on an uplink channel.

In at least one exemplary implementation of the embodiments, the search space is contained in a first set, and the first set includes at least one search space.

It should be noted that the first set is indicated by configuring, for the UE, search space configuration information in resources for uplink transmission.

In at least one exemplary implementation of the embodiments, the search space is contained in a second set, wherein the second set is a subset of the first set, and the second set is configured by the base station for the UE, or is preconfigured in the base station and the UE.

In at least one exemplary implementation of the embodiments, a sending period of at least one search space in the second set is N times of a configuration period of the at least one search space in the first set, wherein N is greater than or equal to 1.

In at least one exemplary implementation of the embodiments, P search spaces subsequent to M search spaces in the first set are taken as at least one search space in the second set, wherein M and P are natural numbers.

In at least one exemplary implementation of the embodiments, the base station fails to detect data sent by the UE on an uplink channel corresponding to each search space of the M search spaces.

In some exemplary implementations, the present embodiment provides the following two modes of indication information to trigger a contention-based random access procedure or a non-contention-based random access procedure.

Mode 1 is to configure random access sequence index information in the indication information, and instruct the UE to initiate a non-contention-based random access procedure or a contention-based random access procedure through the random access sequence index information. For example, in a case where the random access sequence index is 0, the UE is instructed to initiate a contention-based random access procedure; and in a case where the random access sequence index is not 0, the UE is instructed to initiate a non-contention-based random access procedure, and to use a random access sequence indicated by the random access sequence index. The downlink channel is a downlink control channel. The indication information is a Physical Downlink Control Channel order (PDCCH Order), which is a sending format of DCI for triggering random access.

Mode 2 is to configure index information of a random access channel in the indication information, and instruct the UE to initiate a non-contention-based random access procedure or a contention-based random access procedure through the index information of the random access channel. For example, in a case where the index information of the random access channel is 0, the UE is instructed to initiate a contention-based random access procedure; and in a case where the index information of the random access channel is not 0, the UE is instructed to initiate a non-contention-based random access procedure, and to use resources of a random access channel indicated by the index information of the random access channel. Similar to the first mode, the downlink channel is a downlink control channel. The indication information is a PDCCH Order.

In at least one exemplary implementation of the embodiments, in a case of detecting that there is data sent by the UE in an uplink channel corresponding to the search space, the base station sends the indication information to the UE via the downlink control channel in the search space.

In at least one exemplary implementation of the embodiments, in a case where the base station sends the indication information to the UE via the downlink control channel in the search space, and the indication information is used for indicating to trigger the non-contention-based random access procedure, the indication information further includes location information, in a random access channel resource set, of a random access channel allocated in the non-contention-based random access procedure. The location information is at least used for indicating one of the following: the random access channel allocated in the non-contention-based random access procedure is contained in a random access channel resource set and is a Q-th random access channel after the indication information; or the random access channel allocated in the non-contention-based random access procedure is contained in the random access channel resource set and is an R-th random access channel preceding a next uplink channel resource, wherein Q and R are positive integers.

It should be noted that the uplink channel resources refer to the uplink transmission resources configured by the base station for supporting the UE to send data in the RRC IDLE state.

Through the description of the above implementations, those having ordinary skill in the art can understand that the method according to the above embodiment may be implemented by means of software plus a necessary general hardware platform, and of course, may also be implemented through hardware, but in many cases, the former is a better implementation. Based on such understanding, the essence of technical solution of the embodiments of the present disclosure, or in other words, the part of the technical solutions making contributions to the conventional art, may be embodied in the form of a software product stored in a storage medium (such as a Read-Only Memory (ROM)/ Random Access Memory (RAM), a magnetic disk and an optical disc), including a number of instructions for enabling a terminal device (which may be a mobile phone, a computer, a server, or a network device, etc.) to perform the methods described in various embodiments of the present disclosure.

Embodiment 2

Provided is a method for processing access control signaling. FIG. 2 is a flowchart of a method for sending access control signaling according to an embodiment of the present disclosure. As shown in FIG. 2, the method includes the following operations.

At S202, UE receives, on a downlink control channel in a search space, indication information sent by a base station, wherein the indication information is used for indicating to trigger a contention-based random access procedure or a non-contention-based random access procedure.

At S204, the UE determines, according to the indication information, to send a contention-based random access signaling or a non-contention-based random access signaling.

In at least one exemplary implementation of the embodiments, the indication information includes HARQ-ACK information for data sent by the UE on an uplink channel.

In at least one exemplary implementation of the embodiments, the search space is contained in a first set, and the first set includes at least one search space.

In at least one exemplary implementation of the embodiments, the method further includes the following operation. The UE detects the indication information on the downlink control channel in the search space contained in a second set, wherein the second set is a subset of the first set, and the second set is configured by the base station for the UE, or is preconfigured in the base station and the UE.

In at least one exemplary implementation of the embodiments, a sending period of at least one search space in the second set is N times of a configuration period of the at least one search space in the first set, wherein N is greater than or equal to 1.

In at least one exemplary implementation of the embodiments, P search spaces subsequent to M search spaces in the first set are taken as at least one search space in the second set, wherein M and P are natural numbers.

In at least one exemplary implementation of the embodiments, the UE does not send data on an uplink channel corresponding to each search space of the M search spaces.

In at least one exemplary implementation of the embodiments, the method further includes the following operation. The UE sends data on an uplink channel corresponding to the search space in which the UE receives the indication information sent by the base station.

In at least one exemplary implementation of the embodiments, in a case where the UE determines, according to the indication information, to send the non-contention-based random access signaling, the method further includes the following operation. The UE executes, in a case where a first condition is satisfied, a first operation according to a random access response message sent by the base station, wherein the first condition includes at least one of the following: HARQ-ACK information in the indication information is an ACK; and a value of a domain in uplink resource grant information in the random access response message is a first value set, wherein the first operation includes at least one of the following: the UE detects the downlink control channel in the search space; and the UE sends data on an uplink channel subsequent to a current uplink channel.

In some exemplary implementations, at least one domain is contained in the uplink resource grant information. Meanwhile, the uplink resource grant information further includes necessary configuration information for uplink transmission.

It should be noted that, the domain herein may be resource allocation information for uplink transmission, and the first value set may be a set of values corresponding to invalid resource allocations for uplink transmission.

In at least one exemplary implementation of the embodiments, the operation that the UE detects the downlink control channel in the search space includes: the UE detects the downlink control channel in the search space within a first time window, wherein a length of the first time window and a starting moment of the first time window are configured by the base station for the UE or are preconfigured in the base station and the UE; or, the UE detects the downlink control channel in the search space until a detection time of the search space expires.

In at least one exemplary implementation of the embodiments, in a case where the UE determines, according to the indication information, to send the non-contention-based random access signaling, the method further includes the following operation. The UE executes, in a case where a second condition is satisfied, a second operation according to a random access response message sent by the base station, wherein the second condition includes at least one of the following: HARQ-ACK information in the indication information is a NACK; and the random access response message sent by the base station includes uplink resource grant information, wherein the second operation includes at least one of the following: the UE sends data on an uplink channel subsequent to a current uplink channel; or the UE sends data on an uplink channel indicated by the uplink resource grant information in the random access response message.

It should be noted that the uplink channel after the current uplink channel is the uplink transmission resource configured by the base station for the UE to support the UE to send data in an RRC_IDLE state. The uplink data is retransmission data of the uplink data corresponding to the NACK information, that is to say, if the value of the uplink resource grant information is valid, the UE can use the resource.

In some exemplary implementations, the Transmission Block Size (TBS) value corresponding to the data sent in the second operation is the TBS corresponding to the resources configured by the base station for the UE to send the data in the RRC_IDLE state.

In at least one exemplary implementation of the embodiments, in a case where the second operation is that the UE sends data on the uplink channel indicated by the uplink resource grant information in the random access response message, and the UE receives ACK information fed back by the base station for the second operation, the method further includes the following operation. The UE detects the downlink control channel in the search space within a second time window, wherein a length of the second time window and a starting moment of the second time window are configured by the base station for the UE or are preconfigured in the base station and the UE; or, the UE detects the downlink control channel in the search space until a detection time of the search space expires.

In at least one exemplary implementation of the embodiments, in a case where the second operation is that the UE sends data on the uplink channel indicated by the uplink resource grant information in the random access response message, and the UE receives NACK information fed back by the base station for the second operation, the method further includes an operation that the UE sends a random access signal on a random access channel.

In some exemplary implementations, the UE sending the random access signal on the random access channel means that the UE initiates a random access procedure.

In at least one exemplary implementation of the embodiments, in a case where the UE triggers the non-contention-based random access procedure according to the indication information, and the UE sends data on an uplink channel indicated by uplink resource grant information in a received random access response message, the base station sends, on the downlink channel in the search space, HARQ-ACK information for data sent on the uplink channel indicated by the uplink resource grant information in the random access response message.

In at least one exemplary implementation of the embodiments, in a case where the indication information is used for indicating to trigger the non-contention-based random access procedure, the UE sends a non-contention-based random access signaling on a random access channel, wherein location information of the random access channel is configured in the indication information, and the location information is used for indicating at least one of the following: the random access channel allocated in the non-contention-based random access procedure is contained in a random access channel resource set and is a Q-th random access channel after the indication information; the random access channel allocated in the non-contention-based random access procedure is contained in the random access channel resource set and is an R-th random access channel preceding a next uplink channel resource, wherein Q and R are positive integers.

In at least one exemplary implementation of the embodiments, after the UE receives, on the downlink control channel in the search space, the indication information sent by the base station, the method further includes at least one of the following operations: the UE sends a random access signal on a random access channel; the UE transits back to an RRC_IDLE state; the UE proposes an uplink transmission mode; and the UE releases uplink channel resources and/or search space resources of uplink transmission.

To facilitate the understanding of the content described in the foregoing two embodiments, the following scenario is further provided.

In a wireless communication system, a base station sends uplink transmission configuration information to a UE, wherein the uplink channel configuration information includes configuration information of an uplink channel resource; configuration information of a downlink control channel search space.

In the embodiment, the uplink transmission configuration information is used to support data transmission of the UE in the RRC_IDLE state.

The configuration information of the uplink channel resources indicates location information of a group of uplink channel resources. FIG. 3 is a schematic diagram of time domain configuration of uplink transmission configuration information according to an embodiment of the present disclosure. As shown in FIG. 3, a configuration period of an uplink channel resource is 1 hour, and a deviation amount of a time domain location of the uplink channel resource within the configuration period is 10 minutes. FIG. 3 shows locations of 24 uplink channel resources within 24 hours, which are numbered as "uplink channel resource 1" to "uplink channel resource 24" respectively.

The configuration information of a downlink control channel search space is a downlink control channel search space dedicated to the UE, and the search space includes a transmission resource set (also referred to as a sending opportunity) of at least one downlink control channel. Downlink Control Information (DCI) is carried on a downlink control channel for transmission. Each uplink channel resource corresponds to one downlink control channel search space. FIG. 4 is a schematic diagram of another time domain configuration of uplink transmission configuration information according to an embodiment of the present disclosure. As shown in FIG. 4, a downlink control channel search space corresponding to an uplink channel resource with an index of 1 is a search space 1, and a time domain interval exists between a starting moment of the search space 1 and an ending moment of the uplink channel resource 1, which is defined as a time domain interval 1. By analogy, a downlink control channel search space corresponding to an uplink channel resource with an index of 24 is a search space 24, and a time domain interval exists between a starting moment of the search space 24 and an ending moment of the uplink channel resource 24, which is defined as a time domain interval 24.

Scenario 1:

In the embodiment, a UE sends data on an uplink channel resource 1, then a base station may send a PDCCH Order on a search space 1. In this scenario, the HARQ-ACK information is NACK, which indicates that data transmission on the uplink channel resource 1 fails. The index information of the random access channel is 0, which instructs the UE to initiate a contention-based random access procedure. The UE detects the PDCCH Order sent by the base station in the search space 1 and acquires that the HARQ-ACK information is NACK and the index information of the random access channel is 0, then the UE initiates a contention-based random access procedure.

In this scenario, in a case where the UE does not send data on the uplink channel resource 2, the base station does not send a PDCCH Order on the search space 2.

Scenario 2:

A base station may select some or all of the search spaces among the 24 search spaces for sending the PDCCH Order, for example, the configuration period of the search space in which the base station can send the PDCCH Order is four times the configuration period of the search space, and thus the search spaces 1, 5, 9, 13, 17 and 21 can be used for sending the PDCCH Order. Meanwhile, the UE detects a PDCCH Order on the downlink control channel in search spaces 1, 5, 9, 13, 17, and 21.

In a case where the base station detects that data sent by the UE has not been received on any of the m uplink channels, the base station may send the PDCCH Order in the search spaces corresponding to the next p uplink channels. The UE detects a PDCCH Order sent from the base station in search spaces corresponding to p uplink channels after m uplink channels on which no data is sent.

Scenario 3:

A UE sends data on an uplink channel resource 1, and a base station sends a PDCCH Order on a search space 1. The PDCCH Order includes index information of a random access channel and HARQ-ACK information for data sent on an uplink channel resource.

In this scenario, the index information of the random access channel is 1, i.e., instructing the UE to initiate a non-contention-based random access procedure. The HARQ-ACK information for data sent on the uplink channel resource 1 is an ACK, which indicates that the data sent by the UE on the uplink channel resource 1 has been successfully received by the base station.

In this scenario, a UE sends a Physical Random Access Channel Preamble (PRACH Preamble, also referred to as Msg1) on a random access channel with index information of 1, and after receiving the Msg1, a base station sends a Random Access Response (also referred to as Msg2) to the UE. After receiving the Msg2, the UE performs at least one of the following operations.

If the search space 1 does not expire, the UE continues to detect the downlink control channel in the search space 1; if the search space 1 expires, the UE sends data on the uplink channel resource 2 upon arrival of the moment of the uplink channel resource 2.

Alternatively, after the arrival of the moment of the uplink channel resource 2, the UE sends data on the uplink channel resource 2

In this scenario, when the UE continues to detect the downlink control channel in search space 1, the detection duration is configured by the base station or configured by default or is the duration until search space 1 expires.

Scenario 4:

In this scenario, a UE sends data on an uplink channel resource 1, and a base station sends a PDCCH Order on a search space 1. The PDCCH Order includes index information of a random access channel and HARQ-ACK information for data sent on an uplink channel resource.

In this scenario, the index information of the random access channel is 1, i.e., instructing the UE to initiate a non-contention-based random access procedure. The HARQ-ACK information of data sent on the uplink channel resource 1 is NACK, which means that the data sent by the UE on the uplink channel resource 1 is not successfully received by the base station.

In this scenario, the UE sends a random access channel preamble signal (i.e., Msg1) on a random access channel with index information of 1, and the base station sends a random access response message (i.e., Msg2) to the UE upon reception of the Msg1. After receiving the Msg2, the UE sends, on the uplink channel resource 2 at the arrival of the moment of the uplink channel resource 2, retransmission data of the data sent on the uplink channel resource 1.

In addition to this scenario, if the base station configures valid uplink transmission information on the UL grant in the Msg2, the UE sends, on the uplink channel resource indicated by the UL grant, the retransmission data of the data sent on the uplink channel resource 1.

Scenario 5:

In this scenario, a UE sends data on an uplink channel resource 1, and a base station sends a PDCCH Order on a search space 1. The PDCCH Order includes index information of a random access channel and HARQ-ACK information for data sent on an uplink channel resource.

In this scenario, the index information of the random access channel is 1, i.e., instructing the UE to initiate a non-contention-based random access procedure. The HARQ-ACK information of data sent on the uplink channel resource 1 is NACK, which means that the data sent by the UE on the uplink channel resource 1 is not successfully received by the base station.

In this scenario, the UE sends a random access channel preamble signal (i.e., Msg1) on a random access channel with index information of 1, and the base station sends a random access response message (i.e., Msg2) to the UE upon reception of the Msg1. After receiving the Msg2, if the base station configures valid uplink transmission information on the UL grant in the Msg2, the UE sends, on the uplink channel resource indicated by the UL grant, retransmission data of the data sent on the uplink channel resource 1.

After receiving the ACK information for the retransmission data for the uplink channel resource 1 from the base station, the UE performs at least one of the following operations.

If the search space 1 does not expire, the UE continues to detect the downlink control channel in the search space 1; if the search space 1 expires, the UE sends data on the uplink channel resource 2 upon arrival of the moment of the uplink channel resource 2.

Alternatively, after the arrival of the moment of the uplink channel resource 2, the UE sends data on the uplink channel resource 2.

In this scenario, when the UE continues to detect the downlink control channel in search space 1, the detection duration is configured by the base station or configured by default or is the duration until search space 1 expires.

After the UE receives the NACK information for the retransmission data for the uplink channel resource 1 from the base station, the UE sends a random access signal on a random access channel, and initiates a random access procedure.

Embodiment 3

The embodiment provides a device for sending access control signaling, which is used for implementing the described embodiments and example implementations, and the details having been described will not be repeated. As used below, the term "module" may implement a combination of software and/or hardware of a predetermined function. Although the apparatus described in the following embodiments is preferably implemented in software, the implementation in hardware or a combination of software and hardware is also possible and contemplated.

Figure 5:
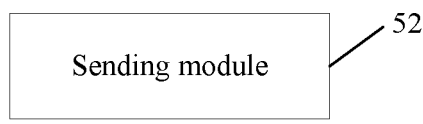
FIG. 5 is a structure diagram of a device for sending access control signaling according to an embodiment of the present disclosure.

FIG. 5 is a structure diagram of a device for sending access control signaling according to an embodiment of the present disclosure. As shown in FIG. 5, the device is located in a base station, and the device includes:

a sending module 52, configured to send indication information to UE via a downlink control channel in a search space, wherein the indication information is used for indicating to trigger a contention-based random access procedure or a non-contention-based random access procedure.

It is to be noted that each of the above modules may be implemented by software or hardware. For the latter, the modules may be implemented by, but not limited to, either of the following manners: the above modules are all located in the same processor; or, the above modules are located in different processors in any combination form respectively.

Embodiment 4

A device for processing access control signaling is provided in the present embodiment, and the device is used for implementing the described embodiments and example implementations, and the details having been described will not be repeated. As used below, the term "module" may implement a combination of software and/or hardware of a predetermined function. Although the apparatus described in the following embodiments is preferably implemented in software, the implementation in hardware or a combination of software and hardware is also possible and contemplated.

Figure 6:
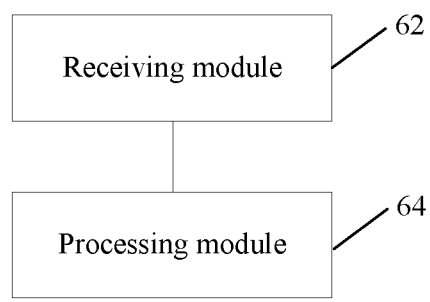
FIG. 6 is a structure diagram of a device for processing access control signaling according to an embodiment of the present disclosure.

FIG. 6 is a structure diagram of a device for processing access control signaling according to an embodiment of the present disclosure. As shown in FIG. 6, the device is located in UE, and the device includes:

a receiving module 62, configured to receive, on a downlink control channel in a search space, indication information sent by a base station, wherein the indication information is used for indicating to trigger a contention-based random access procedure or a non-contention-based random access procedure; and a processing module 64, configured to determine, according to the indication information, to send a contention-based random access signaling or a non-contention-based random access signaling.

It is to be noted that each of the above modules may be implemented by software or hardware. For the latter, the modules may be implemented by, but not limited to, either of the following manners: the above modules are all located in the same processor; or, the above modules are located in different processors in any combination form respectively.

Embodiment 4

An embodiment of the present disclosure provides a storage medium. The storage medium stores a computer program, wherein the computer program is configured to execute the operations in any one of the method embodiments at runtime.

In at least one exemplary implementation of the embodiments, the storage medium may be configured to store a computer program for executing the following operations.

S1, a base station sends indication information to UE via a downlink control channel in a search space, wherein the indication information is used for indicating to trigger a contention-based random access procedure or a non-contention-based random access procedure.

Or,

S1, UE receives, on a downlink control channel in a search space, indication information sent by a base station, wherein the indication information is used for indicating to trigger a contention-based random access procedure or a non-contention-based random access procedure; and S2, the UE determines, according to the indication information, to send a contention-based random access signaling or a non-contention-based random access signaling.

In at least one exemplary implementation of the embodiments, the storage medium may include, but is not limited to, any medium that can store a computer program, such as a USB flash drive, a Read-Only Memory (ROM), a Random Access Memory (RAM), a removable hard disk, a magnetic disk, or an optical disc.

An embodiment of the present disclosure provides an electronic device, including a memory and a processor, wherein the memory stores a computer program, and the processor is configured to run the computer program to execute the operations in any one of the method embodiments.

In at least one exemplary implementation of the embodiments, the electronic device may further include a transmission device and an input/output device, wherein the transmission device is connected to the processor, and the input/output device is connected to the processor.

In at least one exemplary implementation of the embodiments, the processor may be arranged to execute the following operations by means of a computer program:

S1, a base station sends indication information to UE via a downlink control channel in a search space, wherein the indication information is used for indicating to trigger a contention-based random access procedure or a non-contention-based random access procedure.

Or,

S1, UE receives, on a downlink control channel in a search space, indication information sent by a base station, wherein the indication information is used for indicating to trigger a contention-based random access procedure or a non-contention-based random access procedure; and S2, the UE determines, according to the indication information, to send a contention-based random access signaling or a non-contention-based random access signaling.

Optionally, specific implementations for the present embodiment may refer to the examples described in the above embodiments and alternative implementations, and details are not repeated in the present embodiment.

It is apparent that a person skilled in the art shall understand that all of the above-mentioned modules or operations in the present disclosure may be implemented by using a general computation apparatus, may be centralized on a single computation apparatus or may be distributed on a network composed of multiple computation apparatuses. Optionally, they may be implemented by using executable program codes of the computation apparatuses. Thus, they may be stored in a storage apparatus and executed by the computation apparatuses, the shown or described operations may be executed in a sequence different from this sequence under certain conditions, or they are manufactured into each integrated circuit module respectively, or multiple modules or operations therein are manufactured into a single integrated circuit module. Thus, the embodiments of the present disclosure are not limited to any specific hardware and software combination.

The above is only the exemplary embodiments of the present disclosure, not intended to limit the present disclosure. As will occur to those having ordinary skill in the art, the present disclosure is susceptible to various modifications and changes. Any modifications, equivalent replacements, improvements and the like made within the principle of the present disclosure shall fall within the scope of protection of the present disclosure.

What is claimed is:

1. A method for sending access control signaling, comprising:
    sending, by a base station, indication information to a User Equipment (UE) via a downlink control channel in a search space, wherein the indication information is used for indicating to trigger a contention-based random access procedure or a non-contention-based random access procedure,
    the search space is contained in a first set, the first set comprises at least one search space, the search space is contained in a second set, the second set is a subset of the first set, and the second set is configured by the base station for the UE, or is preconfigured in the base station and the UE;
    wherein a sending period of at least one search space in the second set is N times of a configuration period of the at least one search space in the first set, wherein N is greater than or equal to 1; or, P search spaces subsequent to M search spaces in the first set are taken as at least one search space in the second set, wherein M and P are natural numbers, wherein the base station fails to detect data sent by the UE on an uplink channel corresponding to each search space of the M search spaces.

2. The method according to claim 1, wherein the indication information comprises Hybrid Automatic Repeat Request Acknowledgement (HARQ-ACK) information for data sent by the UE on an uplink channel.

3. The method according to claim 1, wherein in a case of detecting that there is data sent by the UE in an uplink channel corresponding to the search space, the base station sends the indication information to the UE via the downlink control channel in the search space.

4. The method according to claim 1, wherein in a case where the base station sends the indication information to the UE via the downlink control channel in the search space, and the indication information is used for indicating to trigger the non-contention-based random access procedure,
    the indication information further comprises location information, in a random access channel resource set, of a random access channel allocated in the non-contention-based random access procedure, wherein the location information is at least used for indicating one of the following:
    the random access channel allocated in the non-contention-based random access procedure is contained in the random access channel resource set and is a Q-th random access channel after the indication information; or
    the random access channel allocated in the non-contention-based random access procedure is contained in the random access channel resource set and is an R-th random access channel preceding a next uplink channel resource;
    wherein Q and R are positive integers.

5. A method for processing access control signaling, comprising:
    detecting, by a User Equipment (UE), indication information on a downlink control channel in a search space contained in a second set, wherein the search space is contained in a first set, the first set comprises at least one search space, the second set is a subset of the first set, and the second set is configured by a base station for the UE, or is preconfigured in the base station and the UE;
    receiving, by the UE on the downlink control channel in the search space, the indication information sent by the base station, wherein the indication information is used for indicating to trigger a contention-based random access procedure or a non-contention-based random access procedure; and determining, by the UE according to the indication information, to send a contention-based random access signaling or a non-contention-based random access signaling;
wherein a sending period of at least one search space in the second set is N times a configuration period of the at least one search space in the first set, wherein N is greater than or equal to 1; or, P search spaces subsequent to M search spaces in the first set are taken as at least one search space in the second set, wherein M and P are natural numbers, wherein the UE does not send data on an uplink channel corresponding to each search space of the M search spaces.

6. The method according to claim 5, wherein the indication information comprises Hybrid Automatic Repeat Request Acknowledgement (HARQ-ACK) information for data sent by the UE on an uplink channel.

7. The method according to claim 5, further comprising: sending, by the UE, data on an uplink channel corresponding to the search space in which the UE receives the indication information sent by the base station.

8. The method according to claim 5, wherein in a case where the UE determines, according to the indication information, to send the non-contention-based random access signaling, the method further comprises:
executing, by the UE in a case where a first condition is satisfied, a first operation according to a random access response message sent by the base station;
wherein the first condition comprises at least one of:
Hybrid Automatic Repeat Request Acknowledgement (HARQ-ACK) information in the indication information is an Acknowledgement (ACK); and
a value of a domain in uplink resource grant information in the random access response message is a first value set;
wherein the first operation comprises at least one of:
detecting, by the UE, the downlink control channel in the search space; and
sending, by the UE, data on an uplink channel subsequent to a current uplink channel.

9. The method according to claim 8, wherein detecting, by the UE, the downlink control channel in the search space comprises:
detecting, by the UE, the downlink control channel in the search space within a first time window, wherein a length of the first time window and a starting moment of the first time window are configured by the base station for the UE or are pre-configured in the base station and the UE;
or,
detecting, by the UE, the downlink control channel in the search space until a detection time of the search space exceeds a preset threshold.

10. The method according to claim 5, wherein in a case where the UE determines, according to the indication information, to send the non-contention-based random access signaling, the method further comprises:
executing, by the UE in a case where a second condition is satisfied, a second operation according to a random access response message sent by the base station;
wherein the second condition comprises at least one of:
Hybrid Automatic Repeat Request Acknowledgement (HARQ-ACK) information in the indication information is a Non-Acknowledgement (NACK); and
the random access response message sent by the base station comprises uplink resource grant information;
wherein the second operation comprises at least one of:
sending, by the UE, data on an uplink channel subsequent to a current uplink channel;
sending, by the UE, data on an uplink channel indicated by the uplink resource grant information in the random access response message.

11. The method according to claim 10, wherein in a case where the second operation is that the UE sends data on the uplink channel indicated by the uplink resource grant information in the random access response message, and the UE receives ACK information fed back by the base station for the second operation, the method further comprises:
detecting, by the UE, the downlink control channel in the search space within a second time window, wherein a length of the second time window and a starting moment of the second time window are configured by the base station for the UE or are pre-configured in the base station and the UE; or, detecting, by the UE, the downlink control channel in the search space until a detection time of the search space expires;
or,
in a case where the second operation is that the UE sends data on the uplink channel indicated by the uplink resource grant information in the random access response message, and the UE receives NACK information fed back by the base station for the second operation, the method further comprises:
sending, by the UE, a random access signal on a random access channel.

12. The method according to claim 5, wherein
in a case where the UE determines, according to the indication information, to trigger the non-contention-based random access procedure, and the UE sends data on an uplink channel indicated by uplink resource grant information in a received random access response message, the base station sends, on the downlink channel in the search space, Hybrid Automatic Repeat Request Acknowledgement (HARQ-ACK) information for data set on the uplink channel indicated by the uplink resource grant information in the random access response message;
or,
in a case where the indication information is used for indicating to trigger the non-contention-based random access procedure, the UE sends a non-contention-based random access signaling on a random access channel, wherein location information of the random access channel is configured in the indication information, and the location information is used for indicating at least one of the following: the random access channel allocated in the non-contention-based random access procedure is contained in a random access channel resource set and is a Q-th random access channel after the indication information; the random access channel allocated in the non-contention-based random access procedure is contained in a random access channel resource set and is an R-th random access channel preceding a next uplink channel resource; wherein Q and R are positive integers;
or,
after receiving, by the UE on the downlink control channel in the search space, the indication information sent by the base station, the method further comprises at least one of the following: sending, by the UE, a random access signal on a random access channel; transiting, by the UE, back to a Radio Resource Control Idle (RRC_IDLE) state; proposing, by the UE, an uplink transmission mode; and releasing, by the UE, at least one of uplink channel resources and search space resources of uplink transmission.

13. A device for sending access control signaling, located in a base station and comprising a memory storing instructions and a processor in communication with the memory, wherein the processor is configured to execute the instructions to:
send indication information to a User Equipment (UE) via a downlink control channel in a search space, wherein the indication information is used for indicating to trigger a contention-based random access procedure or a non-contention-based random access procedure, the search space is contained in a first set, the first set comprises at least one search space, the search space is contained in a second set, the second set is a subset of the first set, and the second set is configured by the base station for the UE, or is preconfigured in the base station and the UE;
wherein a sending period of at least one search space in the second set is N times of a configuration period of the at least one search space in the first set, wherein N is greater than or equal to 1; or, P search spaces subsequent to M search spaces in the first set are taken as at least one search space in the second set, wherein M and P are natural numbers, wherein the base station fails to detect data sent by the UE on an uplink channel corresponding to each search space of the M search spaces.

14. A device for processing access control signaling, located in a User Equipment (UE) and comprising a memory storing instructions and a processor in communication with the memory, wherein the processor is configured to execute the instructions to perform the method according to claim 5.

* * * * *